United States Patent
Hampson (10) Patent No.: US 10,962,665 B2
(45) Date of Patent: Mar. 30, 2021

(54) METHOD FOR DETERMINING FREE SURFACE REFLECTIVITY FOR SEISMIC DATA PROCESSING

(71) Applicant: DownUnder GeoSolutions Pty Ltd., West Perth (AU)

(72) Inventor: Gary Hampson, Peppermint Grove (AU)

(73) Assignee: DownUnder GeoSolutions Pty Ltd., West Perth (AU)

( * ) Notice: Subject to any disclaimer, the term of this patent is extended or adjusted under 35 U.S.C. 154(b) by 290 days.

(21) Appl. No.: 16/107,489

(22) Filed: Aug. 21, 2018

(65) Prior Publication Data

US 2019/0086567 A1  Mar. 21, 2019

Related U.S. Application Data (63) Continuation of application No. PCT/US2017/019805, filed on Feb. 28, 2017.

(60) Provisional application No. 62/306,704, filed on Mar. 11, 2016.

(51) Int. Cl.

| | |
|---|---|
| *G01V 1/36* | (2006.01) |
| *G01V 1/30* | (2006.01) |
| *G01V 1/38* | (2006.01) |
| *G01V 1/20* | (2006.01) |
| *G01V 99/00* | (2009.01) |

(52) U.S. Cl.
CPC ............. *G01V 1/307* (2013.01); *G01V 1/20* (2013.01); *G01V 1/303* (2013.01); *G01V 1/36* (2013.01); *G01V 1/38* (2013.01); *G01V 1/3808* (2013.01); *G01V 99/005* (2013.01); *G01V 2210/56* (2013.01)

(58) Field of Classification Search
USPC .......................................................... 702/18
See application file for complete search history.

(56) References Cited

U.S. PATENT DOCUMENTS 10,324,210 B2 *  6/2019  Coates ................... G01V 1/364
2006/0227659 A1  10/2006  Grion
(Continued)

OTHER PUBLICATIONS

Australian Examination report dated Jun. 28, 2019, Australian Application No. 2017228842.
(Continued)

*Primary Examiner* — Paul D Lee
(74) *Attorney, Agent, or Firm* — Richard A. Fagin (57) ABSTRACT

A method according to one aspect for deghosting seismic data includes determining wave heights in an area wherein marine seismic data have been acquired by actuating a seismic energy source in a body of water and detecting seismic energy at each of a plurality of spaced apart seismic receivers deployed in the water. A reflectivity distribution function of the water surface is determined using the determined wave heights. A ghost function is determined from the reflectivity distribution function. The ghost function is applied to the marine seismic data to deghost the marine seismic data. In other embodiments, the reflectivity distribution function may be used to invert notional source signatures from near field seismic energy or modeling/attenuation free-surface multiples for both land and marine seismic data.

16 Claims, 7 Drawing Sheets

(56) References Cited

U.S. PATENT DOCUMENTS

| | | | |
|---|---|---|---|
| 2007/0189117 A1* | 8/2007 | Robertsson | G01V 1/36 367/24 |
| 2008/0186804 A1 | 8/2008 | Amundsen et al. | |
| 2009/0279388 A1 | 11/2009 | Monk et al. | |
| 2009/0323467 A1* | 12/2009 | Goujon | G01V 1/3835 367/19 |
| 2011/0005151 A1 | 3/2011 | Tenghamn | |
| 2011/0058450 A1* | 3/2011 | van den Berg | G01V 1/38 367/24 |
| 2013/0226463 A1* | 8/2013 | van Borselen | G01V 1/36 702/17 |
| 2013/0308429 A1 | 11/2013 | Soubaras | |
| 2014/0016436 A1* | 1/2014 | Sollner | G01V 1/364 367/24 |
| 2014/0050049 A1 | 2/2014 | Kitchenside et al. | |
| 2014/0121981 A1* | 5/2014 | Synnevaag | G01V 1/364 702/17 |
| 2017/0219732 A1* | 8/2017 | Poole | G01V 1/36 |
| 2017/0248721 A1* | 8/2017 | Poole | G01V 1/36 |
| 2018/0003842 A1* | 1/2018 | Coates | G01V 1/38 |
| 2019/0018157 A1* | 1/2019 | Robertsson | G01V 1/301 |
| 2019/0146112 A1* | 5/2019 | Hampson | G01V 1/3835 367/21 |

OTHER PUBLICATIONS

Seismic source deghosting: Application to the Delta 3 source array, Aug. 2014, DOI: 10.13140/RG.2.1.2663.4088, Thesis for: IDEA League MSc in Applied Geophysics, Advisor: Philippe Caprioli.

Hübscher C., Gohl K (2014) Reflection/Refraction Seismology. In: Harff J., Meschede M., Petersen S., Thiede J. (eds) Encyclopedia of Marine Geosciences. Springer, Dordrecht.

Source Ghost Modeling, May 2015, DOI: 10.13140/RG.2.1.3980. 4328, Report number: SBGS_TECHREPORT_037Affiliation: Saddleback Geosolutions.

International Search Report and Written Opinion, International Application No. PCT/US2017/019805 dated Jun. 8, 2017.

\* cited by examiner

METHOD FOR DETERMINING FREE SURFACE REFLECTIVITY FOR SEISMIC DATA PROCESSING

CROSS REFERENCE TO RELATED APPLICATIONS

Continuation of International Application No. PCT/US2017/019805 filed on Feb. 28, 2017. Priority is claimed from U.S. Provisional Application No. 62/306,704 filed on Mar. 11, 2016. Each of the foregoing applications is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic surveying. More specifically the disclosure relates to seismic surveying for the purpose of geophysical exploration.

Geophysical exploration for and exploitation of subsurface hydrocarbon reserves includes reflection seismic surveying. Reflection seismic surveys can be acquired both onshore (land) and offshore (marine). In a marine seismic survey one or more streamers, i.e., a long cable containing seismic receivers or linear arrays of receivers spaced regularly along its length, are towed behind a boat. A seismic source or sources, typically one or more air gun arrays may also towed directly behind the boat or another vessel. The seismic source creates an acoustic signal that propagates downwardly through the water column and into the geological strata below the water bottom. The acoustic signal is refracted and reflected by the various geological strata, travelling back upwardly where it is ultimately detected by the receivers or receiver arrays in the one or more streamers. A linear array of receivers may include a selected number of receivers spaced apart from each other at a relatively small distance (e.g., ¼ of the shortest wavelength of seismic energy detected in the acoustic signal) and the output of such receivers may be combined, electrically or otherwise, to produce a single detected signal that has reduced effects of horizontally propagating noise.

The seismic source is typically actuated at regular intervals (called "shots") as the seismic vessel or other towing vessel travels along a substantially straight path called a "survey line" or "sail line." Each receiver or array of receivers detects the upwardly traveling acoustic signals described above, and the detected signals are recorded with respect to time. The recording time may be referenced or indexed to the actuation time of the seismic source. Such signal recording produces a single seismic "trace" (a record of signal amplitude detected by each receiver with respect to time) for each receiver or array of receivers. A collection of recorded traces from all receivers or arrays along a single streamer is called a "shot record." A seismic survey may be made up of many shot records made along a single sail line or many parallel sail lines covering a selected area. Raw (pre-stack) shot records undergo sophisticated processing in order to create a final (post-stack) seismic volume for interpretation of geophysical characteristics of the subsurface strata.

An objective of seismic surveying is to record the response of the subsurface strata in the earth to seismic signals. As the need to characterize thinner and more complex hydrocarbon reservoirs increases so too does the demand for high-resolution seismic data. Vertical resolution of seismic data is related to bandwidth, or the range of frequencies that are present in the detected seismic data. Many aspects related to the acquisition and the physics of the propagating acoustic signal act to limit the bandwidth that can be detected by the receivers and recorded.

A well-known factor that limits bandwidth in marine seismic acquisition relates to reflections from the sea surface (air/water interface). Acoustic signals travelling upwardly in the water layer will be reflected from this interface and undergo a reversal in polarity because the reflection coefficient of the air/water interface is approximately −1. Such reflected signals are termed ghost reflections. The receivers in the streamer record not only the desired or "primary" wave field, i.e., a single, upwardly traveling wave field caused by subsurface phenomena, but also will detect the ghost reflections. Ghost reflections destructively interfere with the primary reflection of interest resulting in "notches" in the frequency spectrum of the detected acoustic signal at particular frequencies. These notches limit the useable bandwidth of the seismic data and are thus undesirable. Methods known in the art for reducing the effect of ghost reflections are termed "deghosting."

Deghosting methods known in the art require an accurate description of the reflectivity function of the free surface. In the marine case the free surface is the air-water interface. Often it is assumed that the free surface reflectivity can be defined by a single, constant scalar reflection coefficient value (e.g., −1) and indeed this value is often assumed to be substantially constant (implying that the free surface is in effect a perfect mirror). The practical reality is that the sea surface reflectivity function is much more complicated (for example it is frequency dependent). In order to account for this complexity, better methods for defining the free surface reflectivity function are desirable.

DETAILED DESCRIPTION

Figure 1:
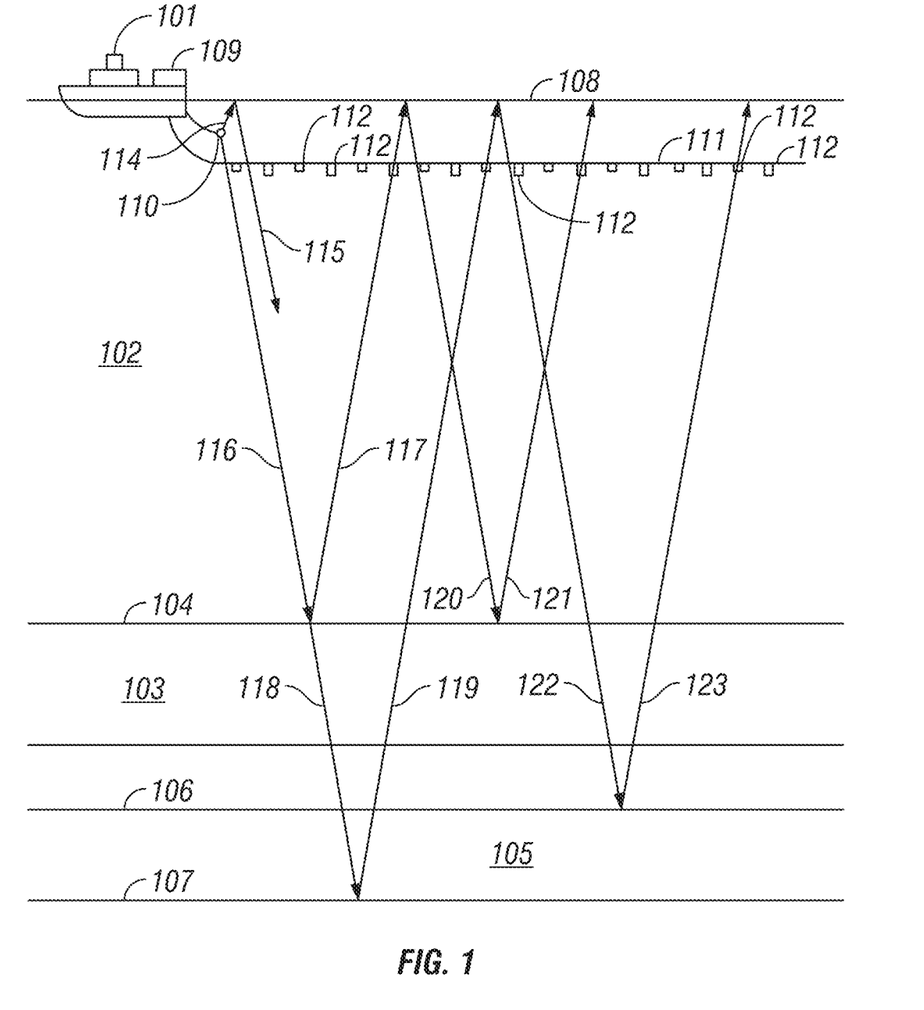
FIG. 1 shows an example of marine seismic data acquisition.

FIG. 1 shows an example embodiment of acquiring marine seismic data that can be used with the method of the invention. A seismic vessel 101 moves along the surface 108 of a body of water 102 above a portion 103 of the subsurface (i.e., formations below the water bottom 104) that is to be surveyed. Beneath the water bottom 104, a portion 103 of the subsurface contains formations of interest such as a layer 105 positioned between an upper boundary 106 and lower boundary 107 thereof. The seismic vessel 101 may contain seismic data acquisition control equipment, designated generally at 109. The seismic data acquisition control equipment 109 may include (none shown separately for clarity of the illustration) navigation control, seismic energy source control, seismic sensor control, and signal recording equipment, all of which can be of types well known in the art.

The seismic data acquisition control equipment 109 may cause a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 (or by a different vessel) to detect the acoustic wave fields initiated by the seismic source 110 and reflected from seismic interfaces in the environment. Although only one seismic streamer 111 is shown in FIG. 1 for illustrative purposes, typically a plurality of laterally spaced apart seismic streamers 111 are towed behind the seismic vessel 101 or by another vessel. The seismic streamers 111 contain sensors to detect the reflected and other wave fields initiated by the seismic source 110. In the present example the seismic streamers 111 contain pressure responsive sensors such as hydrophones 112. The hydrophones 112 are typically disposed in multiple sensor arrays at regular intervals along the seismic streamers 111. However, the type of sensors 112 and their particular locations along the seismic streamers 111 are not intended to be limitations on the present invention.

Each time the seismic source 110 is actuated, an acoustic wave field travels outwardly from the seismic source 110 in spherically expanding wave fronts. The propagation of the wave fronts will be illustrated herein by ray paths which are perpendicular to the wave fronts. An upwardly traveling wave field, designated by ray path 114, will reflect off the water-air interface at the water surface 108 and then travel downwardly, as shown by ray path 115, where such wave field 115 may be detected by the hydrophones 112 in the seismic streamers 111. Such a reflection from the water surface 108, as shown by ray path 115 contains no useful information about the subsurface formations of interest. However, such surface reflections, also known as "ghosts" or "ghost reflections", act as secondary seismic sources with a time delay from initiation of the seismic source 110.

The downwardly traveling wave field from the seismic source 110, shown by ray path 116, will reflect off the earth-water interface at the water bottom 104 and then travel upwardly, as shown by ray path 117, where the wave field may be detected by the hydrophones 112. Such a reflection from the water bottom 104, shown by ray path 117, contains information about the water bottom 104. Ray path 117 is an example of a "primary" reflection, that is, a reflection originating from a boundary in the subsurface. The downwardly traveling wave field, as shown by ray path 116, may transmit through the water bottom 104 as shown by ray path 118, reflect from a layer boundary, such as 107, of a layer, such as 105, and then travel upwardly, as shown by ray path 119. The upwardly traveling wave field, ray path 119, may then be detected by the hydrophones 112. Such a reflection from a layer boundary 107 contains useful information about a formation of interest 105 and is also an example of a primary reflection.

The acoustic wave fields will continue to reflect from interfaces such as the water bottom 104, water surface 108, and layer boundaries 106, 107 in combinations. For example, the upwardly traveling wave field in ray path 117 will reflect off the water surface 108, continue traveling downwardly in ray path 120, may reflect off the water bottom 104, and continue traveling upwardly again in ray path 121, where the wave field may be detected by the hydrophones 112. Ray path 121 is an example of a multiple reflection, also called simply a "multiple", having multiple reflections from interfaces. Similarly, the upwardly traveling wave field in ray path 119 will reflect off the water surface 108, continue traveling downwardly in ray path 122. Such reflected energy as in ray path 122 may be detected by one or more of the hydrophones 112, thus creating a ghost referred to as a "receiver side ghost", the effects of which on the desired seismic signal are similar in nature to the previously described ghost. The seismic energy may reflect off a layer boundary 106 and continue traveling upwardly again in ray path 123, where the wave field may be detected by the hydrophones 112. Ray path 123 is another example of a multiple reflection, also having multiple reflections in the subsurface.

Methods according to the present disclosure were developed with a view to providing a method for defining the free surface reflectivity function for seismic data processing applications, in particular, but not limited to, deghosting. While the following description is made in terms of marine seismic data, the methods disclosed herein are equally applicable to land acquisition of seismic data.

A number of authors have considered the idea of a free-surface reflectivity function that is "blurred." Medwin & Clay (1998) view this from the oceanographic perspective that many wave height distributions are close to Gaussian. Under such circumstances it can be shown that the ghost reflection also has a Gaussian spectrum. Wang & Peng (2012) use a uniform wave height distribution, although they do not discuss the oceanographic validity of such a choice. More recently, Orji et al. (2013) examined the reflectivity of the free-surface modelled in a variety of ways. In reality the surface of the sea changes from moment to moment and any instantaneous view of the sea surface is one realization of a distribution of possible surfaces. It is possible either to derive the free surface shape from moment to moment from recorded seismic data, which is at best very difficult and time consuming and at worst simply not possible, or, it is possible to consider the free surface to have a height distribution that may be translated into a reflectivity distribution and use a resultant "blurred" reflectivity operator as a definition of the free surface.

The following provides time and frequency domain expressions for the resulting ghost functions. It is shown that if the free-surface reflectivity is blurred, then deconvolution of the ghost is much easier than previously thought possible.

Uniform Distribution

Wang & Peng, describe a model of a uniform distribution of ghost delay times $G(\omega)$ as:

$$G(\omega) = \frac{1}{t_{max} - t_{min}} \int_{t_{min}}^{t_{max}} 1 - Re^{-i\omega t} dt = 1 - R \frac{e^{-i\omega t_{max}} - e^{-i\omega t_{min}}}{i\omega(t_{max} - t_{min})} \quad (1)$$

This ghost reflection is a box-car function of time unit area, i.e., the ghost height is the reciprocal of its width similar to the requirements for a Dirac delta function. Some simplification results from letting $t_g = (t_{max} + t_{min})/2$ and $a = (t_{max} - t_{min})/2$, so that Eq. (1) becomes:

$$G(\omega) = \frac{1}{2a} \int_{t_g - a}^{t_g + a} 1 - Re^{-i\omega t} dt = 1 - R\text{sinc}(a\omega)e^{-i\omega t_g} \quad (2)$$

The above expression shows that the uniform distribution results in a sin c function that modulates the complex exponential so that its behavior ranges from being exactly the same as an ordinary ghost (flat surface with reflection coefficient of $-1$) at $\omega=0$ but the interfering effect of the complex exponential reduces with respect to $(a\omega)^{-1}$. This means that as a function of frequency, the ghost notches become more moderate and that phase reversals become more modest. With the components of the complex spectrum:

$$\text{Re}(G(\omega)) = 1 - R \sin c(\alpha w)\cos(\omega t_g)$$

$$\text{Im}(G(\omega)) = R \sin c(a\omega)\sin(\omega t_g) \quad (3)$$

The amplitude spectrum is given by the expression:

$$|G(\omega)| = \sqrt{(1 - R\text{sinc}a\omega\cos\omega t_g)^2 + (R\text{sinc}a\omega\sin\omega t_g)^2} \quad (4)$$

and the phase spectrum is given by the expression:

$$\phi(\omega) = a\tan 2(R \sin c(a\omega)\sin(\omega t_g), 1 - R \sin c(a\omega)\cos(\omega t_g)) \quad (5)$$

Figure 2:
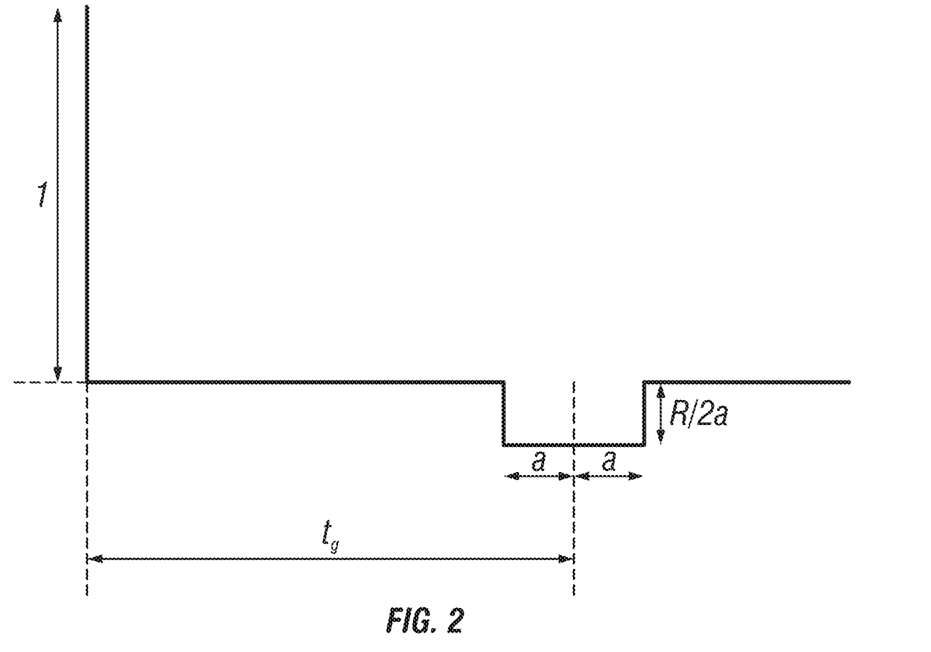
FIG. 2 shows a ghost due to a uniform distribution of wave heights and free-surface reflectivity, R.

A graph of the time domain ghost operator is shown in FIG. 2. It may be observed that the ghost operator comprises a Dirac delta function at $t=0$ and a rectangle function centred on $t_g$ of width $2a$ and height $-R/2a$. It should be noted that it is trivial to add the influence of the ray angle such that the travel time and the distribution width is scaled by $\cos\theta$, that is:

$$G(\omega,\theta) = 1 - R \sin c(a\omega \cos\theta)e^{-i\omega t_g \cos\theta} \quad (6)$$

Gaussian Distribution

Figure 3:
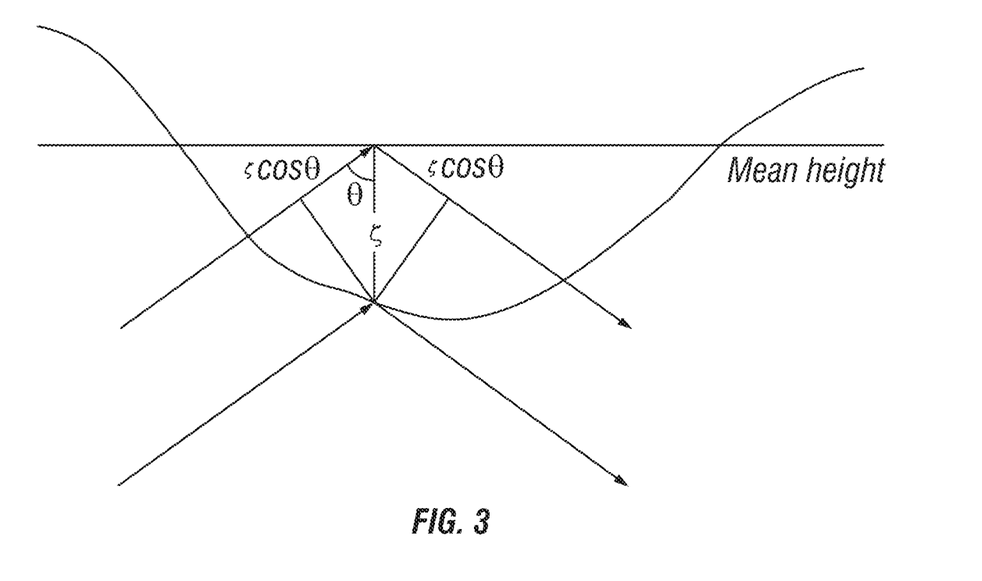
FIG. 3 shows that the time difference between the mean sea-height and the current wave height is 2ζ cos θ/v.

Medwin & Clay (eq. 13.2.3) consider a free-surface that has a Gaussian height distribution with standard deviation $\sigma_h$. As a simplification it is assumes that the free-surface behaves as if it is locally horizontal so that rays reflect symmetrically about a vertical axis. The situation is depicted in FIG. 3. Then integration is performed over this distribution to show that its behavior as a function of frequency is given by the expression:

$$G(\omega) = 1 - Re^{-\frac{1}{2}\left(2\omega\sigma_h \frac{\cos\theta}{v}\right)^2} e^{-i\omega t_g \cos\theta} \quad (7)$$

Lord Rayleigh noted that the reflection from such a free-surface has the higher frequency energy attenuated. With $$Q = 2\omega\sigma_h \frac{\cos\theta}{v} \quad (7)$$

becomes:

$$G(\omega) = 1 - Re^{-\frac{1}{2}Q^2} e^{-i\omega t_g \cos\theta} \quad (8)$$

which has the complex (real (Re) and imaginary (Im)) components:

$$\text{Re}(G(\omega)) = 1 - Re^{-\frac{1}{2}Q^2}\cos(\omega t_g \cos\theta) \quad (9)$$

$$\text{Im}(G(\omega)) = Re^{-\frac{1}{2}Q^2}\sin(\omega t_g \cos\theta)$$

The amplitude spectrum is given by the expression $$|G(\omega)| = \sqrt{\left(1 - Re^{-\frac{1}{2}Q^2}\cos(\omega t_g \cos\theta)\right)^2 + \left(Re^{-\frac{1}{2}Q^2}\sin(\omega t_g \cos\theta)\right)^2} \quad (10)$$

and the phase spectrum is given by the expression:

$$\phi(\omega) = \text{atan2}\left(Re^{-\frac{1}{2}Q^2}\sin(\omega t_g \cos\theta), 1 - Re^{-\frac{1}{2}Q^2}\cos(\omega t_g \cos\theta)\right) \quad (11)$$

By performing the inverse Fourier transform one may find the time domain ghost function. First, inverse Fourier transform the Gaussian function and then delay and scale it with $-R\delta(t-t_g)$ before adding $\delta(0)$. The inverse Fourier transform of the Gaussian function is:

$$\frac{1}{2\pi}\int_{-\infty}^{+\infty} e^{-i\omega t} e^{-\frac{1}{2}\left(2\omega\sigma_h \frac{\cos\theta}{v}\right)^2} d\omega = \frac{1}{2\pi}\int_{-\infty}^{+\infty} e^{-it\omega - \frac{1}{2}\left(2\sigma_h \frac{\cos\theta}{v}\right)^2 \omega^2} d\omega \quad (12)$$

If a and b are set as $$a = \frac{1}{2}\left(2\sigma_h \frac{\cos\theta}{v}\right)^2 \text{ and } b = it/2,$$

respectively and using Gradshteyn & Ryzhic Eq. 2.338(1) then the inverse Fourier transform of the Gaussian function becomes:

$$\frac{1}{2\pi}\int e^{-(a\omega^2 + 2b\omega)} d\omega = \frac{1}{2\pi}\frac{1}{2}\sqrt{\frac{\pi}{a}} e^{\frac{b^2}{a}} \text{erf}\left(\sqrt{a}\,\omega + \frac{b}{\sqrt{a}}\right) \quad (13)$$

Upon substitution of the original variables and applying limits one obtains the inverse Fourier transform of the reflectivity of the normally distributed wave heights:

$$\frac{1}{\sqrt{2\pi}} \frac{v}{2\sigma_h \cos\theta} e^{-\frac{1}{2}\left(t\frac{v}{2\sigma_h \cos\theta}\right)^2} \quad (14)$$

This result indicates that the time domain ghost function is also Gaussian with $\sigma = 2\sigma_h \cos\theta/v$ and its standard form results in unit area. To complete the inverse transform of the ghost operator one may delay the free-surface reflection and add a Dirac delta function at zero time:

$$g(t) = \delta(0) - R\delta(t - t_g\cos\theta) * \frac{1}{\sqrt{2\pi}} \frac{v}{2\sigma_h\cos\theta} e^{-\frac{1}{2}\left(t\frac{v}{2\sigma_h\cos\theta}\right)^2} \quad (15)$$

Figure 4:
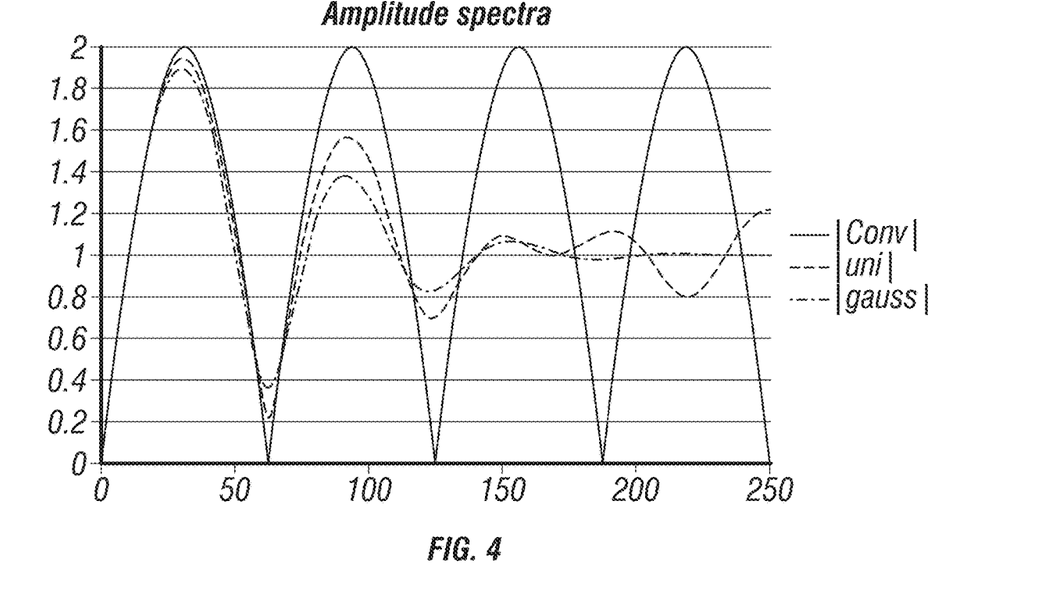
FIG. 4 shows a comparison of the amplitude spectra of a uniformly distributed ghost and the Gaussian distributed ghost. The depth is 12 m. $\sigma_t$=0.0012 s, a=0.003 s.

Now the blurred ghosts may be compared. FIG. 4 shows the amplitude spectra of the two types compared to a conventional spectrum. It is apparent how the spectral notches are moderated increasingly with frequency. Apart from the very lowest frequencies, deconvolution of this spectrum may be expected to be completely stable.

Figure 5:
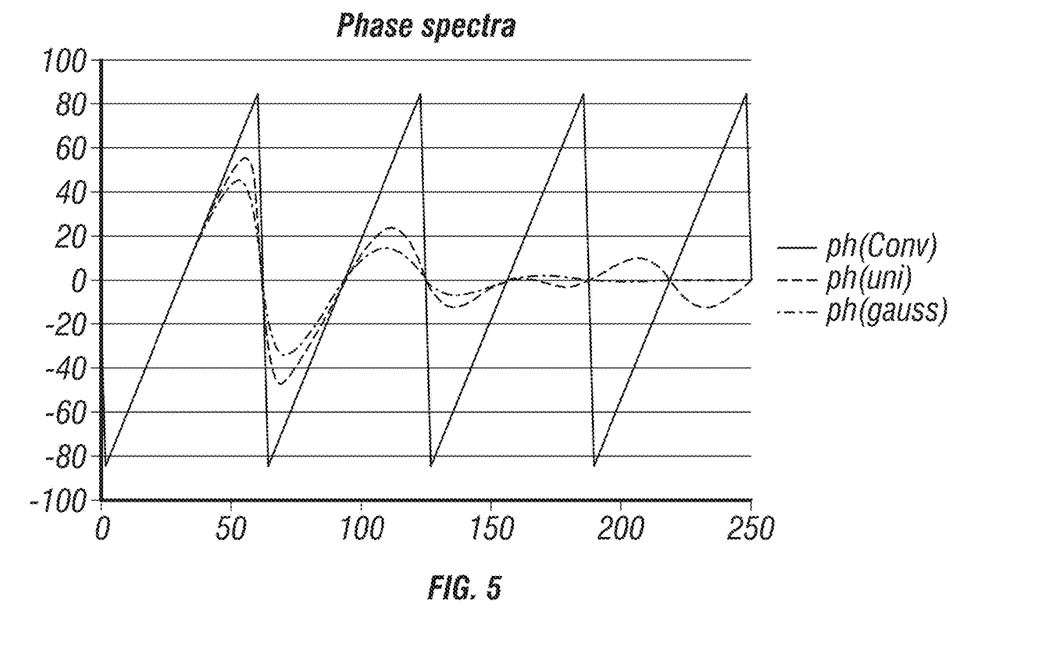
FIG. 5 shows a comparison of the amplitude spectra of the uniformly distributed ghost and the Gaussian distributed ghost. The depth is 12 m. $\sigma_t$=0.0012 seconds, a=0.003 seconds.
Figure 6:
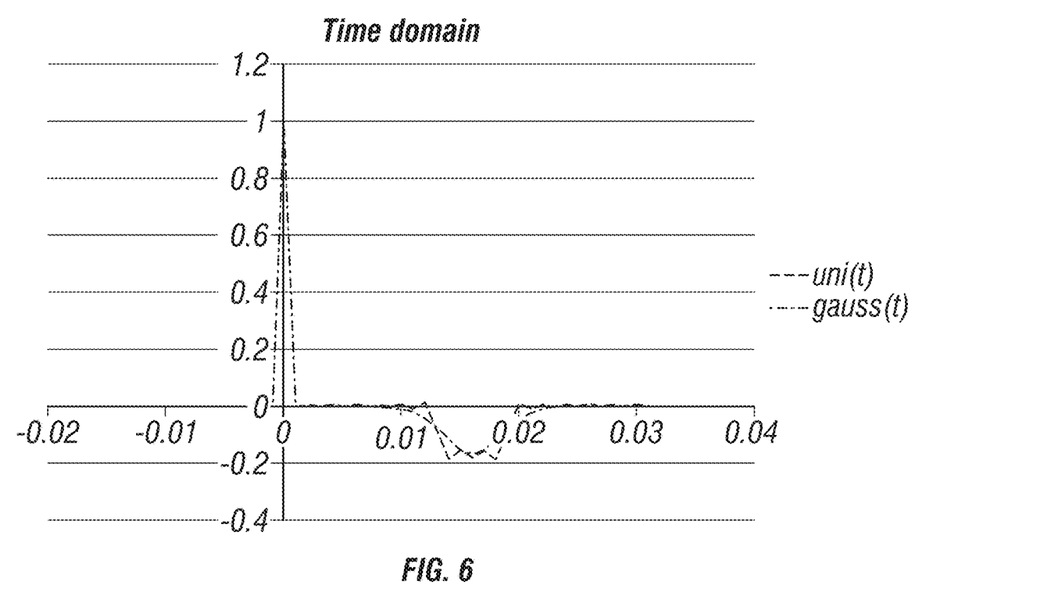
FIG. 6 shows examples of the time domain ghost operators for the uniform and Gaussian wave height distributions. The depth is 12 meters. $\sigma_t$=0.0012 s, a=0.003 s. Frequencies up to 500 Hz were used in the calculation.

FIG. 5 shows a comparison of the phase spectra. The phase discontinuities are increasingly softened as a function of frequency. These softened phase changes are less prone to error. Finally in FIG. 6 the two blurred ghosts are depicted in the time domain. They have been calculated out to 500 Hz, rather than infinite frequency, which is why the ghost event is a band limited rectangle function.

It should be noted that as $\sigma \rightarrow 0$ and $a \rightarrow 0$ both types of distributions tend toward a conventional ghost shape.

General Distributions

Given any wave height distribution function, $P(z)$, with $t=2z \cos \theta/v$, so that $dz/dt=v/(2 \cos \theta)$ then the general ghost function is given by the expression:

$$g(t) = (0) - R\delta(t - z_g|dt/dz|)*|dt/dz|P(dz/dt) \quad (16)$$

in which $z_g$ is the median depth of the seismic energy source or seismic receiver.

Band Limiting Reflectivity

Returning to Eq. (13), note that the limits of integration in that equation are infinite. In a practical application of methods according to the present disclosure it is necessary to band limit this function to avoid aliasing. Therefore, integrating again using symmetrical frequency limits results in the expression:

$$\frac{1}{2\pi} \int_{-q}^{+q} e^{-(a\omega^2 + 2b\omega)} d\omega = \quad (17)$$

$$\frac{1}{2\pi} \frac{1}{2} \sqrt{\frac{\pi}{a}} e^{\frac{b^2}{a}} \left( \text{erf}\left(\sqrt{a} q + \frac{b}{\sqrt{a}}\right) + \text{erf}\left(\sqrt{a} q - \frac{b}{\sqrt{a}}\right) \right)$$

Note that the time variance is $$\sigma_t^2 = 2a = \left(2\sigma_h \frac{\cos\theta}{v}\right)^2.$$

Using the time variance and as $b=it/2$, (17) becomes, $$\frac{1}{2\pi} \frac{1}{\sqrt{2}} \frac{\sqrt{\pi}}{\sigma_t} e^{-\frac{1}{2}\frac{t^2}{\sigma_t^2}} \left( \text{erf}\left(\frac{1}{\sqrt{2}}\left(\sigma_t q + i\frac{t}{\sigma_t}\right)\right) + \text{erf}\left(\frac{1}{\sqrt{2}}\left(\sigma_t q - i\frac{t}{\sigma_t}\right)\right) \right) \quad (18)$$

which may be evaluated using standard intrinsic functions. However, the imaginary component in the error function argument leads quickly to numerical overflow because the underlying integral grows exponentially.

Modification of Rybicki's Algorithm

A method attributable to Rybicki (1989)[also substantially reproduced in Press et al (1986) which was originally used to evaluate Dawson's integral], based upon the sampling theorem, may be used with minor modification to construct band-limited Gaussian functions. Rybicki noted that using the sampling theorem one may write an approximation to a general function as a convolution with the band-limiting sin c operator:

$$g(t) = \sum_{n=-\infty}^{+\infty} g(t_n) \text{sinc}\left(\frac{\pi}{\Delta}(t - t_n)\right) + e(t) \quad (19)$$

in which $t_n = n\Delta$ and $e(t)$ is the error in the approximation. It turns out that to be useful $g(t)$ and $G(\omega)$ should be compact. One function that fits this requirement is the Gaussian function, which is the reason Rybicki found the idea interesting. Starting with the Rybicki Gaussian approximation slightly modified:

$$e^{-t^2} = \sum_{j=-n}^{n} e^{-t_j^2} \text{sinc}\left(\frac{\pi}{\Delta}(t - t_j)\right)\{t_j = j\Delta\} \quad (20)$$

which is the dot product between a segment of a sin c function and the Gaussian function. It is important that the most substantial part of the Gaussian function is spanned by this dot product. If that condition is met then Eq. (20) turns out to be very accurate even with n as small as 3.

Some modifications may be made in a practical embodiment. First one needs to be able to specify the width of the Gaussian function using the standard deviation, $\sigma_t$:

$$e^{-\frac{1}{2}\frac{t^2}{\sigma_t^2}} = \sum_{j=-n}^{n} e^{-\frac{1}{2}\frac{t_j^2}{\sigma_t^2}} \text{sinc}\left(\frac{\pi}{\Delta}(t - t_j)\right)\{t_j = j\Delta\} \quad (21)$$

Next it is desirable to change the band limitation to reflect the sample rate of the seismic traces of interest, rather than simply being concerned about the band-limitation for function estimation purposes. This may be performed by noting that the first term in the sin c function is the maximum frequency permitted by the convolution. This may be simply changed to match the Nyquist frequency of the seismic data traces:

$$\sum_{j=-n}^{n} e^{-\frac{1}{2}\frac{t_j^2}{\sigma_t^2}} \text{sinc}(\omega_{max}(t - t_j))\{t_j = j\Delta\} \quad (22)$$

Finally it is important to ensure that this expression is compatible amplitude-wise with the sin c interpolator that would be used to represent a unit spike. The normal the form used for sin c interpolation is sin $c(\omega_{max} t)$ so that the scaling for the band-limited Gaussian interpolator becomes:

$$\frac{\Delta}{\sigma_t \sqrt{2\pi}} \sum_{j=-n}^{n} e^{-\frac{1}{2}\frac{t_j^2}{\sigma_t^2}} \text{sinc}(\omega(t - t_j)_{max})(\{t_j = j\Delta\}) \quad (23)$$

Returning to the earlier comment regarding the range of the summation, it is necessary that the substantial portions of the Gaussian function are included in the summation. This range needs to include at least $\pm 2.5\sigma$, that is, $$n\Delta \geq 2.5\sigma_t \quad (24)$$

It is also necessary for the sampling theorem to work that the summation is sampled at no greater than $\pi/\omega_{max}$, i.e.

$$\Delta \leq \frac{\pi}{\omega_{max}} \equiv dt \qquad (25)$$

but it is also necessary for there to be several samples of the substantive part of the Gaussian, which suggests:

$$\Delta \leq \min(\sigma_t, dt) \qquad (26)$$

Therefore one may select $\Delta$ using Eq. (26) and then n using Eq. (24).

The calculation requires 2n+1 evaluations of the exponential and sine functions. It turns out that because of the symmetry in the indexing in Eq. (23), it is possible to perform the calculation with n evaluations of the exponential function. This may be obtained using the expression:

$$\frac{\Delta}{\sigma_t \sqrt{2\pi}} \left[ \mathrm{sinc}\left(\omega_{max}()\right. \right.$$

$$\left. \left. \sum_{j=1}^{n} e^{-\frac{1}{2}\frac{t_j^2}{\sigma_t^2}} \{\mathrm{sinc}[\omega(t+t_j)_{max}[]\mathrm{sinc}[\omega(t-t_j)_{max}[]]\}\{t_j = j\Delta\} \right] \qquad (27)$$

Figure 7:
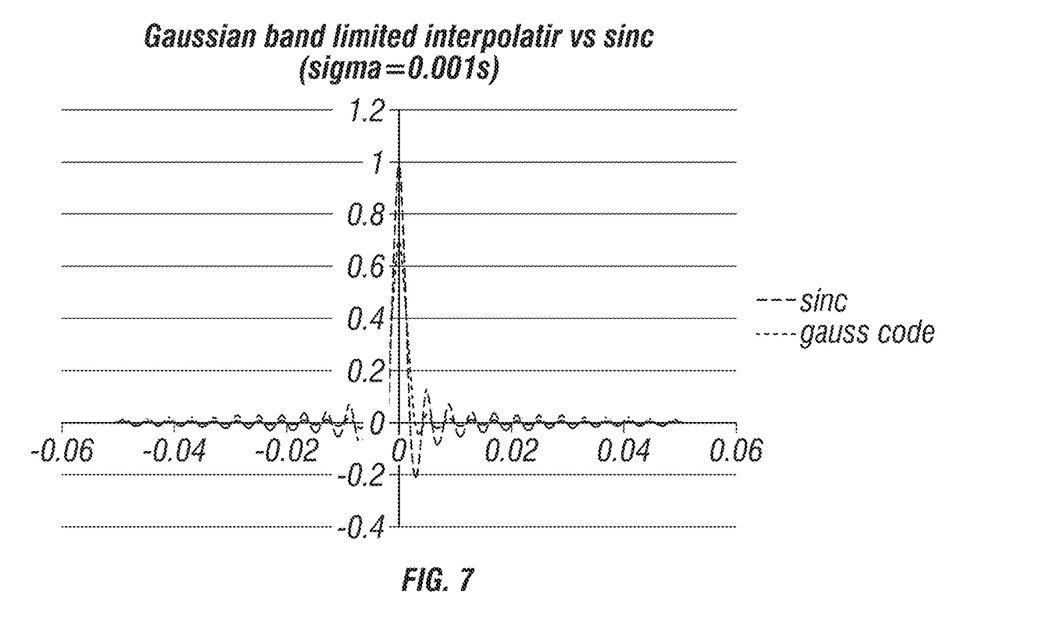
FIG. 7 shows the band limited Gaussian interpolator compared to the sin c interpolator with a maximum frequency of 250 Hz ($\sigma_t$=0.001 s).

FIG. 7 shows an example of the band-limited Gaussian distribution with $\sigma_t$=0.001 s and a maximum frequency of 250 Hz compared to the equivalent sine function.

Figure 8:
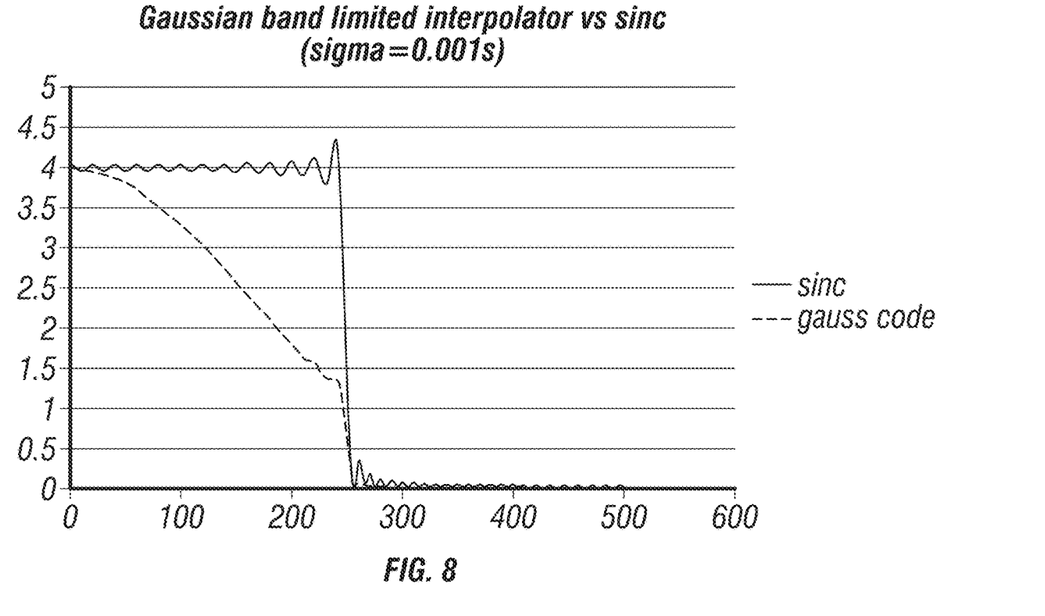
FIG. 8 shows the amplitude spectra of FIG. 7.

FIG. 8 shows the amplitude spectra of FIG. 7. Notice the Gaussian spectral shape which is the same amplitude at DC ($\omega$=0) and then it is truncated at 250 Hz. Gibbs ripples are due to the finite length of the time series that were Fourier transformed.

Finally, recalling that for ghost reflectivity, the Gaussian distribution is angularly dependent since $$\sigma_t = 2\sigma_h \frac{\cos\theta}{v},$$

which may be used in the interpolator to generate ghost reflections.

Frequency-Wavenumber Domain Evaluation

Evaluating the Gaussian ghost function in the frequency wavenumber (f-k) domain may be performed by substitution of k=$\omega$ cos($\theta$)/v into Eq. (7) gives the expression $$G(k_z) = 1 - \mathrm{Re}^{-\frac{1}{2}(2\sigma_h k_z)^2} e^{-i2zk_z} \qquad (28)$$

in which R is a reflectivity scalar. This operator is causal and is referenced to the receiver depth. However, it may be referenced to the surface if multiplied by exp(+izk$_z$) so that:

$$G(k_z) = e^{+izk_z} - \mathrm{Re}^{-\frac{1}{2}(2\sigma_h k_z)^2} e^{-izk_z} \qquad (29)$$

Figure 9:
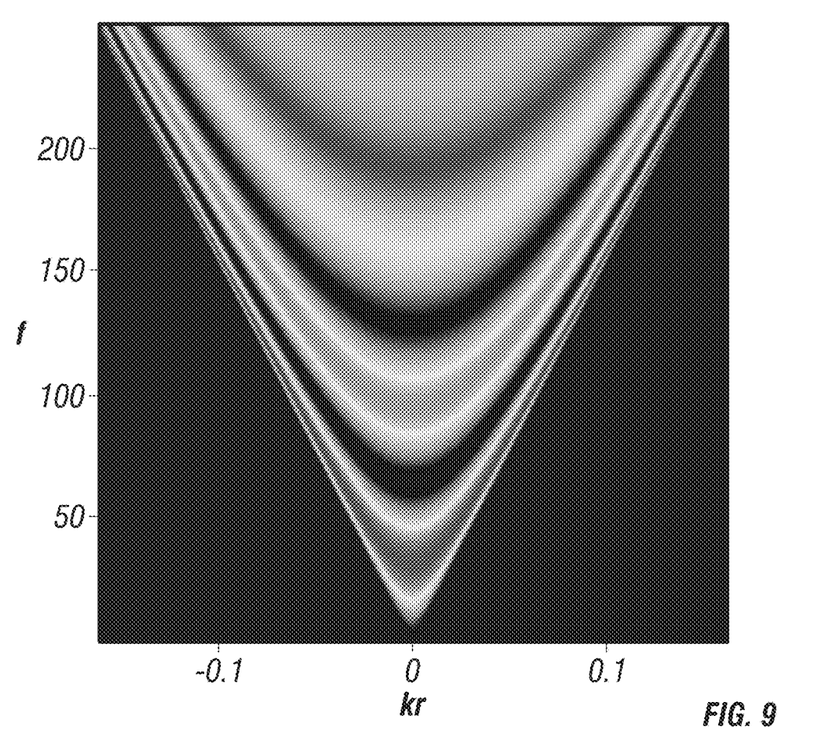
FIG. 9 shows the f-k spectrum of the Gaussian ghost function in which z=12, $\sigma_h$=2 and v=1544.

The foregoing style of ghost means that the reflectivity of the free surface is a function of dip and frequency. It is strongest at high dips and low frequencies. In these conditions, the traditional ghost behaviour prevails. At lower dips and higher frequencies, the reflectivity weakens and the ghost behaviour moderates tending towards no ghost at all. FIG. 9 shows the f-k spectrum of an example in which z=12, $\sigma_h$=2 and v=1544.

An advantage of the foregoing type of function is that the ghost notches are no longer zero, permitting an easier deconvolution.

Figure 10:
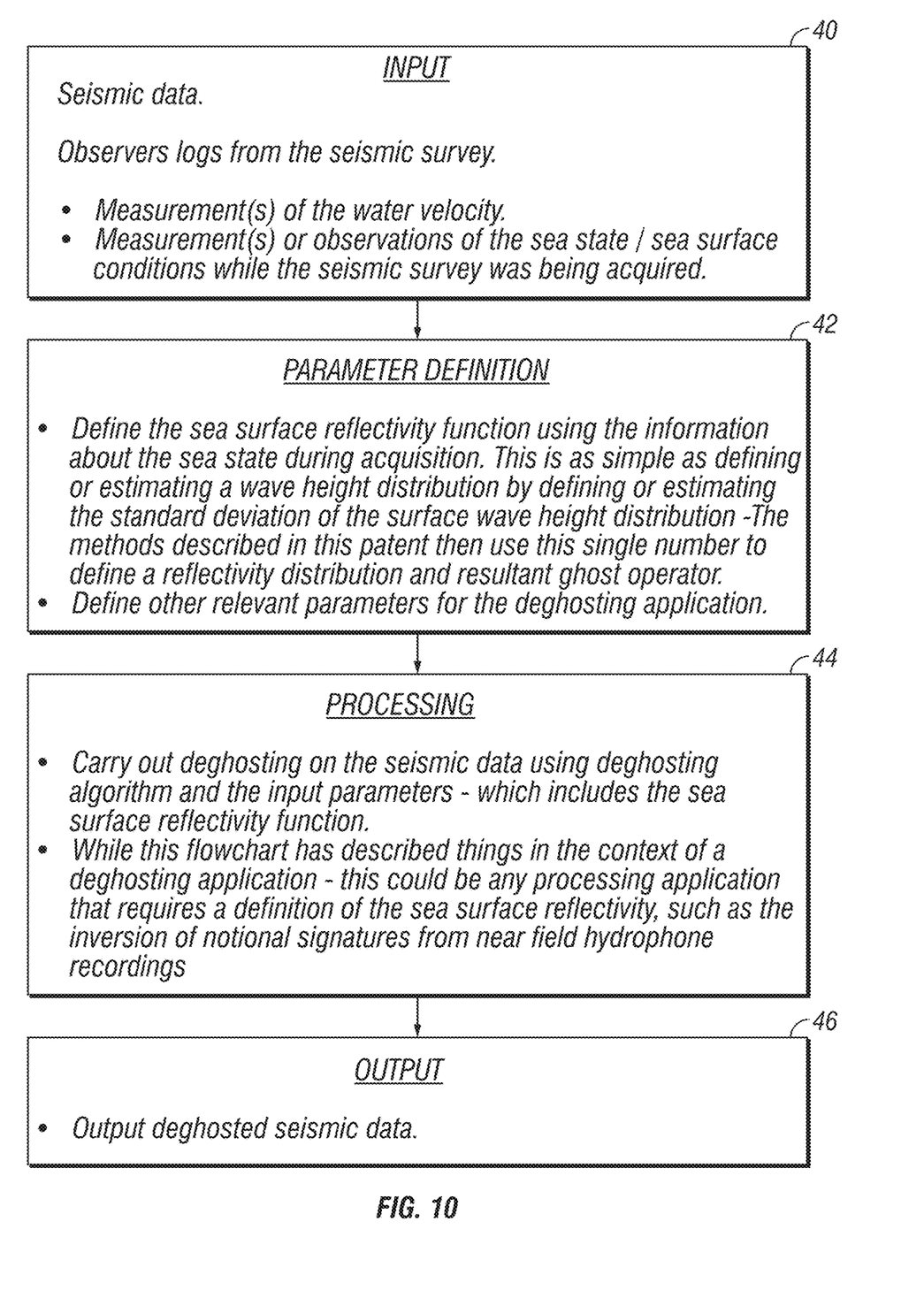
FIG. 10 is a flow chart of an example embodiment according to the present disclosure.

FIG. 10 shows a flow chart of an example implementation of methods according to the present disclosure. At 40, data input, e.g., to a computer system (FIG. 11) may comprise seismic data obtained as described with reference to FIG. 1. Wave height and water acoustic velocity measurements and/or estimates may also be input to the computer system. The wave height measurements and/or estimates (collectively, "determinations" of wave heights) may then be analyzed at 44 to determine their standard deviation. The standard deviation may then be used to define a reflectivity distribution function, for example, using Eq. (7). The inverse Fourier transform of the reflectivity distribution function, e.g., Eq. (13) or its band limited counterpart Eq. (17) may be used to define a ghost function. At 44, the above determined ghost function may be applied to the acquired seismic data to attenuate the effects of ghosting on the seismic data. Deghosted seismic data may be output and recorded at 46.

In other embodiments, the reflectivity distribution function may be used for other seismic data processing methods requiring surface reflectivity as an input. Examples of such other embodiments include, without limitation, using the free-surface reflection function in free-surface multiple reflection (see FIG. 1) modelling and attenuation, and using land free-surface distribution for potential ghost or free surface multiple reflection attenuation. In other embodiments, notional seismic source signatures may be inverted using measurements of near field seismic energy and the reflectivity distribution function.

Figure 11:
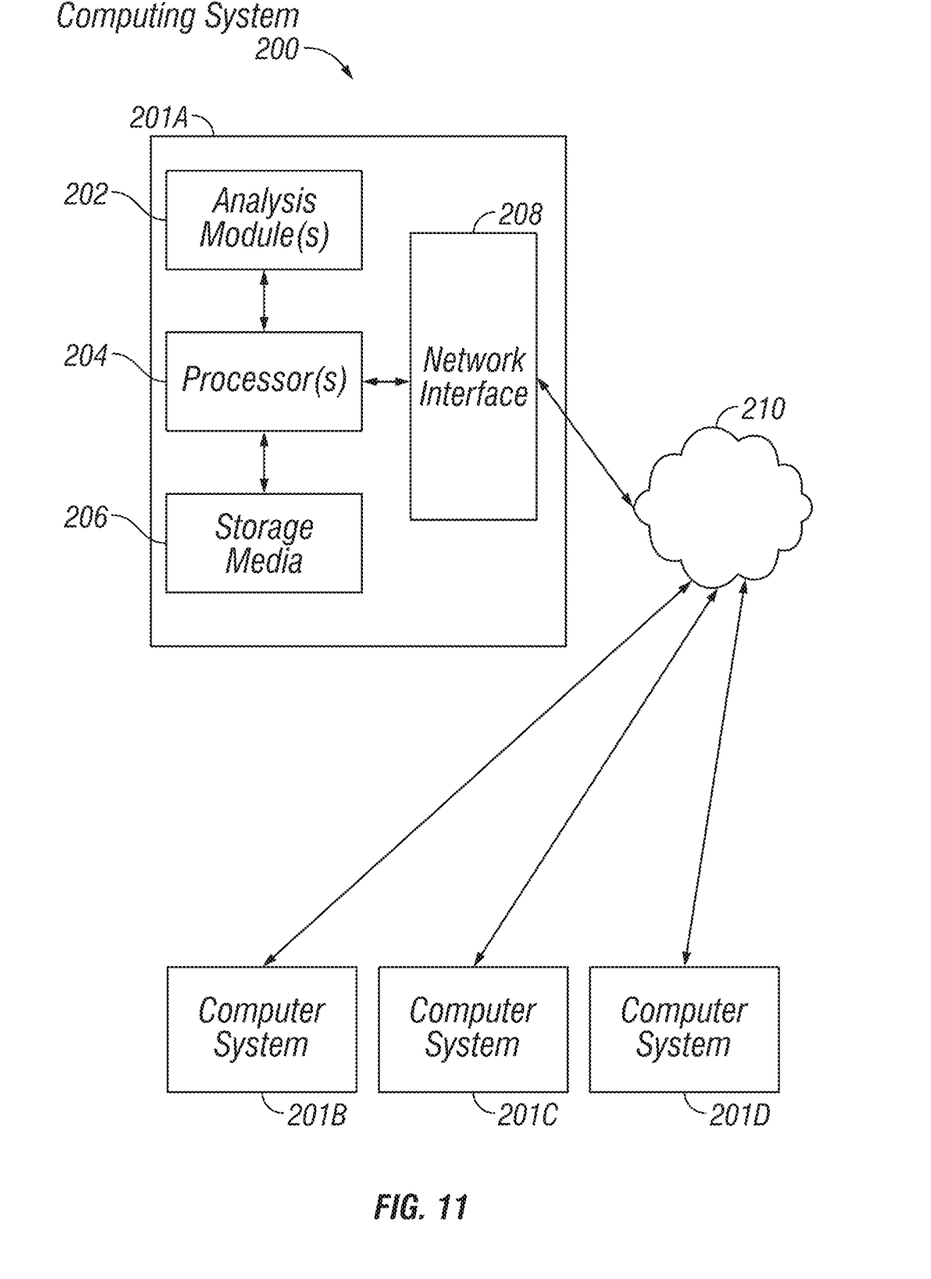
FIG. 11 shows an example computer system that may be used in some embodiments.

All of the above calculations may be performed in any general purpose or purpose specific computer or processor. FIG. 11 shows an example computing system 200 in accordance with some embodiments. The computing system 200 may be an individual computer system 201A or an arrangement of distributed computer systems. The individual computer system 201A may include one or more analysis modules 202 that may be configured to perform various tasks according to some embodiments, such as the tasks explained with reference to FIGS. 2-10. To perform these various tasks, the analysis module 202 may operate independently or in coordination with one or more processors 204, which may be connected to one or more storage media 206. A display device 205 such as a graphic user interface of any known type may be in signal communication with the processor 204 to enable user entry of commands and/or data and to display results of execution of a set of instructions according to the present disclosure.

The processor(s) 204 may also be connected to a network interface 208 to allow the individual computer system 201A to communicate over a data network 210 with one or more additional individual computer systems and/or computing systems, such as 201B, 201C, and/or 201D (note that computer systems 201B, 201C and/or 201D may or may not share the same architecture as computer system 201A, and may be located in different physical locations, for example, computer systems 201A and 201B may be at a well drilling location, while in communication with one or more computer systems such as 201C and/or 201D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 206 may be implemented as one or more computer-readable or machine-readable storage media. Note that while in the example embodiment of FIG. 11 the storage media 206 are shown as being disposed within the individual computer system 201A, in some embodiments, the storage media 206 may be distributed within and/or across multiple internal and/or external enclosures of the individual computing system 201A and/or additional computing systems, e.g., 201B, 201C, 201D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 200 is only one example of a computing system, and that any other embodiment of a computing system may have more or fewer components than shown, may combine additional components not shown in the example embodiment of FIG. 11, and/or the computing system 200 may have a different configuration or arrangement of the components shown in FIG. 22. The various components shown in FIG. 11 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

PUBLICATIONS REFERRED TO IN THE PRESENT DISCLOSURE INCLUDE THE FOLLOWING

Press, W H., Teukolsky, S A., Vetterling, W T., Flannery, B P., 1986, *Numerical Recipes: The Art of Scientific Computing*. New York: Cambridge University Press Rybicki, George B., 1989, *Dawson's Integral and the sampling theorem, Computers in physics*, vol. 3, no. 2, pp 85-87.

H. Medwin and C. S. Clay, 1998, *Fundamentals of Acoustical Oceanography*, 711 pp, Academic Press, London Gradsteyn, I. S., Ryzhik, I. M., 2000, *Table of Integrals, Series, and Products*, 6th ed., Academic Press, Boston.

Wang, P., and Peng, C., 2012, *Premigration deghosting for marine streamer data using a bootstrap approach*, 82nd Annual Meeting, SEG, Expanded Abstracts.

Orji, O., Sollner, W. and Gelius, L., J., 2013, *Sea surface reflection coefficient estimation*, 83rd Annual SEG Meeting Expanded Abstracts, 51-55

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deghosting seismic data, comprising:
   entering into a computer determinations of wave heights in an area wherein marine seismic data have been acquired by actuating a seismic energy source in a body of water and detecting seismic energy at each of a plurality of spaced apart seismic receivers deployed in the water;
   in the computer, determining a reflectivity distribution function of the water surface using the determinations of wave heights, wherein the reflectivity distribution function is determined from a standard deviation of the wave heights;
   in the computer, determining a ghost function from the reflectivity distribution function;
   in the computer, applying the ghost function to deghost the marine seismic data; and
   in the computer, generating an output comprising deghosted marine seismic data.

2. The method of claim 1 wherein the reflectivity distribution function is a Gaussian (or normal) distribution function.

3. The method of claim 2 wherein the Gaussian distribution function is band limited.

4. The method of claim 1 wherein the wave heights are measured.

5. A method for marine seismic surveying, comprising:
   actuating a seismic energy source in a body of water;
   detecting seismic energy at at least one seismic receiver deployed in the water, the seismic energy resulting from the actuating the seismic energy source;
   determining wave heights during the actuating the seismic energy source and the detecting seismic energy;
   in a computer, determining a reflectivity distribution function of the water surface using the measured wave heights, wherein the reflectivity distribution function is determined from a standard deviation of the wave heights;
   in the computer, determining a ghost function from the reflectivity distribution function;
   in the computer, applying the ghost function to deghost the detected seismic energy; and
   in the computer, generating an output comprising deghosted seismic data.

6. The method of claim 5 wherein the reflectivity distribution function is a Gaussian (or normal) distribution function.

7. The method of claim 5 wherein the Gaussian distribution function is band limited.

8. The method of claim 5 wherein the wave heights are measured.

9. A method for processing seismic signals, comprising:
entering into a computer determinations of at least one of (i) free surface elevations for land surveys and (ii) wave heights for marine surveys in an area wherein seismic data have been acquired by actuating a seismic energy source proximate to an area of the subsurface to be evaluated and detecting seismic energy at each of a plurality of spaced apart seismic receivers deployed proximate the area;
in the computer, determining a reflectivity distribution function of the free surface using the determinations of the at least one of surface elevations and wave heights, wherein the reflectivity distribution is determined from a standard deviation of the determinations of the at least one of surface elevations and wave heights;
in the computer, using the reflectivity distribution to at least one of (iii) modeling and attenuating effects of free surface multiple reflections or ghost reflections on the detected seismic energy and (iv) inverting notional source signatures from near field detected seismic energy; and
in the computer, generating an output comprising seismic data that have at least one of attenuated effects of free surface multiple and determined inverted notional source signatures.

10. The method of claim 9 wherein the reflectivity distribution function is a Gaussian (or normal) distribution function.

11. The method of claim 10 wherein the Gaussian distribution function is band limited.

12. The method of claim 9 wherein the free surface elevations are measured.

13. The method of claim 9 wherein the wave heights are measured.

14. A method for processing seismic signals, comprising:
entering into a computer determinations of at least one of (i) free surface elevations for land surveys and (ii) wave heights for marine surveys in an area wherein seismic data have been acquired by actuating a seismic energy source proximate to an area of the subsurface to be evaluated and detecting seismic energy at each of a plurality of spaced apart seismic receivers deployed proximate the area;
in the computer, determining a reflectivity distribution function of the free surface using the determinations of the at least one of surface elevations and wave heights, wherein the reflectivity distribution function is a band limited Gaussian or normal distribution function;
in the computer, using the reflectivity distribution to at least one of (iii) modeling and attenuating effects of free surface multiple reflections or ghost reflections on the detected seismic energy and (iv) inverting notional source signatures from near field detected seismic energy; and
in the computer, generating an output comprising seismic data that have at least one of attenuated effects of free surface multiple and determined inverted notional source signatures.

15. The method of claim 14 wherein the free surface elevations are measured.

16. The method of claim 14 wherein the wave heights are measured.

* * * * *